No. 889,902. PATENTED JUNE 9, 1908.
A. M. CAMPBELL & A. F. GOLDING.
VARIABLE SPEED PULLEY.
APPLICATION FILED JAN. 2, 1908.

2 SHEETS—SHEET 1.

WITNESSES:
Fred White
René Bruine

INVENTORS:
Archibald Macgregor Campbell,
and Arthur Frank Golding,
By Attorneys, No. 889,902. PATENTED JUNE 9, 1908.
A. M. CAMPBELL & A. F. GOLDING.
VARIABLE SPEED PULLEY.
APPLICATION FILED JAN. 2, 1908.

2 SHEETS—SHEET 2.

WITNESSES:
Fred White
Rene Muine

INVENTORS:
Archibald Macgregor Campbell,
and Arthur Frank Golding,
By Attorneys,

UNITED STATES PATENT OFFICE.

ARCHIBALD MACGREGOR CAMPBELL AND ARTHUR FRANK GOLDING, OF HOBART, TASMANIA, AUSTRALIA.

VARIABLE-SPEED PULLEY.

No. 889,902.   Specification of Letters Patent.   Patented June 9, 1908.

Application filed January 2, 1908. Serial No. 408,907.

*To all whom it may concern:*

Be it known that we, ARCHIBALD MACGREGOR CAMPBELL and ARTHUR FRANK GOLDING, both of Hobart, Tasmania, Commonwealth of Australia, have invented certain new and useful Improvements in an Improved Variable-Speed Pulley, of which the following is a specification.

This invention has reference to a novel construction of pulleys composed of a plurality of segmental sections by means of which the diameter of same may be altered.

Our invention presents improvements over the ordinary segmental pulley, the sections of which ordinary pulleys are integral with studs and operated upon by a cone slidably mounted upon the same shaft as the pulley.

Figure 7:
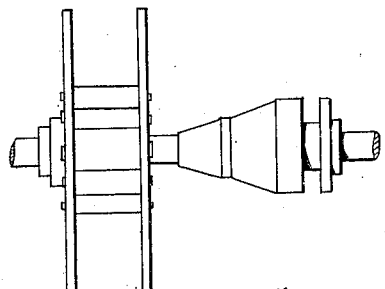

One feature of the invention as applied to such pulleys is the provision whereby more than two speeds may be obtained with the same pulley. This is effected by forming the cone with a narrow step or parallel annular platform at one or more intervals between its apex and base. Thus, by means of same, when the cone is thrust into the pulley the studs aforesaid will find a resting place on the platform until the cone is pushed further. Figure 7 is shown wherein this form of cone is illustrated.

Figures 1, 2:
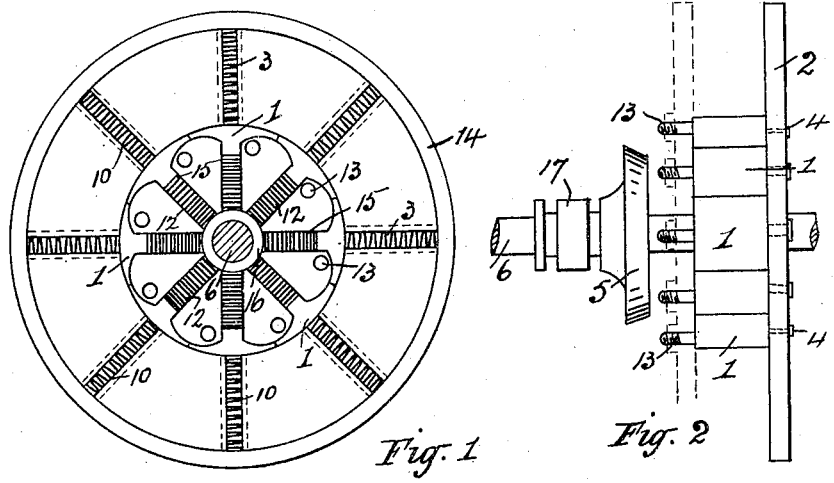
Figures 4, 5:
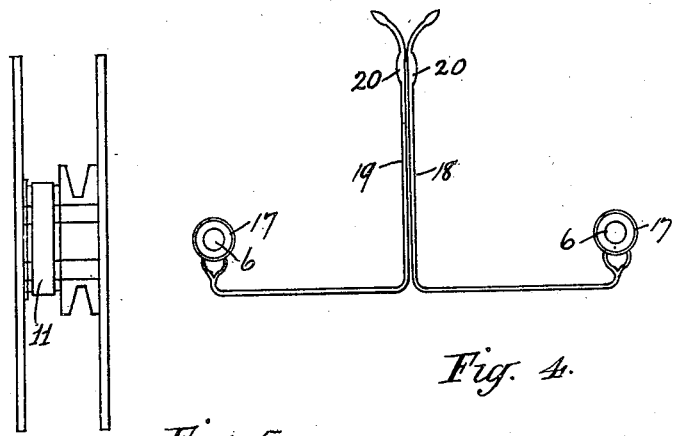
Figure 3:
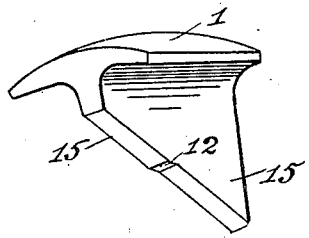
Figure 6:
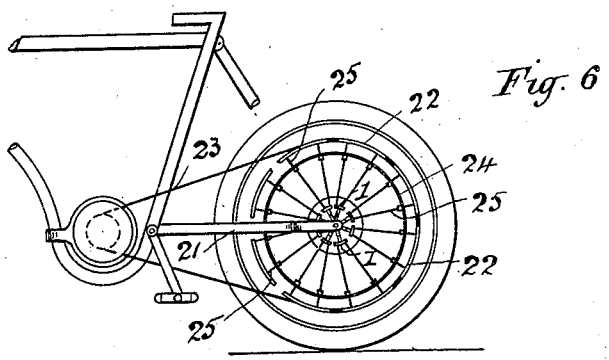

The particular form of pulley we prefer to use and which has advantages over those now in use is illustrated in the accompanying drawings, in which Fig. 1 is a front elevation of a segmental section pulley, and Fig. 2 is a side elevation of same. Fig. 3 is a detail showing the construction of one of the segments. Fig. 4 is a diagram used to explain how same can be operated. Fig. 5 shows a form of V pulley operable according to Fig. 2, with contractor band for keeping it normally closed. Fig. 6 shows the application of the pulley to a motor bicycle wheel. Fig. 7 illustrates the stepping or interruption of the surface of a cone used in known form of variable speed pulleys.

Referring to Figs. 1, 2 and 3, the pulley sections 1 are held between flanges 2, in one or both of which are radial slots 3. The sections are each provided with a T piece (see Fig. 2, dotted lines) the waist of which is adapted to slide in the slot 3 for the purpose of guiding the sections in their radial movement. The heads 4 of the T pieces come through the slots 3. Slidably mounted on the same shaft 6 as the sections 1, is a truncated cone 5. This member is extremely truncated and is really a chamfered disk. The sections 1 are made integral with ribs or webs 15 the lower ends of which are near to the shaft 6. The webs are provided with a surface to receive the impact of the member 5, and at one or more intervals such surface may be interrupted or stepped as shown at 12. In the construction of a pulley of this kind, we employ studs 13, that are secured in one flange 2, and project far enough to be capable of being attached (by bolts or the like) to the other flange, the center of which is hollow to permit of the disk 5 being introduced. The slots 3 contain springs 10 which are compressed when the pulley is expanded and serve to return the sections to the normal position. Instead of the springs 10, we may use a rubber band 11 as shown in connection with a V pulley in Fig. 5. The slots 3 are made by boring the flange from its periphery the hole thus formed being opened out to form a groove, the width of which is not sufficient to permit the spring to fall out. After inserting the latter, a ring 14 is placed on the circumference of the flange to secure the whole.

In applying the invention, two pulleys will be employed, the diameters of which will vary inversely. For operating the pulleys, we use any convenient system of levers whereby, when one disk is thrust inwards the other can be withdrawn or left unmoved.

In Fig. 4 we show a diagrammatic view of two levers that may be suitably mounted and arranged in relation to the collars 17 on the disks so that the above-mentioned results may be obtained. The upper ends of the levers are provided with parts which, when combined, form a bulb 20, that is used to grip the two levers. Above the bulb, the ends flare outwards, so that should it be necessary to put over only one of the levers, as when it is desirable to cut the engine out, that lever may be gripped independently of the other, and both or either of the pulleys be contracted.

The invention is intended for application principally to motor vehicles, and in Fig. 6 we have shown it applied to the rear wheel of a motor bicycle, wherein one pulley is mounted on the wheel hub while the driving pulley is on the engine spindle. The rear fork 21 is bent outwards to permit of the pulley and cone being accommodated. The pulley sections in this instance are connected by rods 25 to sections 22 of the rim pulley upon which the belt 23 runs. A ring 24, which is attached to the spokes of the wheel is perforated to receive the rods radiating from the pulley. The rods 25 pass through the ring 24 and move accordingly as the pulley is expanded or retracted, thereby increasing or decreasing the diameter of the belt rim formed by the sections 22. In the figure the pulley and the rim are shown expanded.

In operation, the disk 5 is forced into the pulley by means of a convenient arrangement of the levers. On its contacting with the webs 15 the pulley will be opened and it will continue to expand until the step or platform 12 is reached, when the expanding motion will cease and the pulley will to some extent be locked in its expanded position until a little extra force is used to push the disk further. There may be one or more interruptions or platforms around the interior of the pulley according to the number of intermediate speeds required.

In the construction of Fig. 6 the parts operate in the same way, the pulley sections moving the rim sections. In this construction the driving pulley of the engine may also be made expansible and contractible to obtain differences in speed and to maintain the belt at the proper tension.

Having now described our invention what we claim as new and desire to secure by patent is:—

1. A variable speed pulley having a plurality of segmental sections, each of said sections having a rib or web, which has an inclined face of substantially the width of the rib, such faces taken collectively forming an internal cone-like structure and a disk mounted in axial line with the pulley and adapted to enter said cone-like structure and move said sections outwardly by contact with various parts of said inclined faces, each of said inclined faces being interrupted by a step or steps against which said disk can rest.

2. The combination with a variable speed pulley made up of a number of ribbed segmental sections, and means for expanding such sections, of a flexible band placed upon or adjacently to the pulley, as and for the purpose set forth.

3. The combination in the rear wheel of a motor bicycle of a variable speed pulley having sections, rods which radiate from the pulley sections, a supporting ring secured to the wheel through which said rods pass, and a belt rim divided into sections corresponding to the pulley sections, the rim sections being secured to the outer ends of the rods, as set forth.

4. A variable speed pulley having a plurality of segmental sections, each section having an oblique face of substantially the width of the section so that the several sections form an internal cone-like structure, and means acting against said faces for expanding said pulley, one of said parts having a step or steps whereby variations of speed may be obtained.

In witness whereof, we have hereunto signed our names in the presence of two subscribing witnesses.

ARCHIBALD MACGREGOR CAMPBELL.
ARTHUR FRANK GOLDING.

Witnesses:
   ALAN HARDY,
   R. C. LEWIS.